United States Patent [19]

Broberg et al.

[11] Patent Number: 4,667,162
[45] Date of Patent: May 19, 1987

[54] RING LASER START UP APPARATUS

[75] Inventors: Theodore W. Broberg, New Brighton; David D. Rathe, Cottage Grove, both of Minn.

[73] Assignee: Honeywell Inc., Minneapolis, Minn.

[21] Appl. No.: 625,405

[22] Filed: Jun. 28, 1984

Related U.S. Application Data

[62] Division of Ser. No. 338,757, Jan. 11, 1982, Pat. No. 4,481,635.

[51] Int. Cl.⁴ .............................................. H01S 3/083
[52] U.S. Cl. ..................................... 330/4.3; 372/86; 372/94; 356/350
[58] Field of Search ................. 372/81, 86, 87, 94; 356/350; 330/4.3

[56] References Cited

U.S. PATENT DOCUMENTS

| | | | |
|---|---|---|---|
| 3,688,217 | 8/1972 | Witte et al. ........................ 313/198 |
| 4,088,965 | 5/1978 | Laudeslager et al. ................ 372/86 |
| 4,257,015 | 3/1981 | Ljung .................................. 356/350 |
| 4,287,487 | 9/1981 | Kawabara et al. .................. 372/86 |
| 4,481,635 | 11/1984 | Broberg et al. ..................... 372/94 |
| 4,507,788 | 3/1985 | Bernie et al. ........................ 372/86 |

FOREIGN PATENT DOCUMENTS

| 0141228 | 12/1978 | Fed. Rep. of Germany ........ 372/86 |
| 2030688 | 2/1969 | France ................................. 356/350 |

OTHER PUBLICATIONS

Application having Ser. No. 796,753, filed Feb. 5, 1969, by R. Johnson entitled Energetic Particle Barrier For Gas Discharge Laser Mirror Protection corresponds to the French Pat. No. 2,030,688.

Primary Examiner—Nelson Moskowitz
Attorney, Agent, or Firm—Robert A. Pajak

[57] ABSTRACT

Start up apparatus for starting the laser beams in a laser angular rate sensor with improved reliability and in a reduced amount of time.

8 Claims, 4 Drawing Figures

RING LASER START UP APPARATUS

This application is a division of application Ser. No. 338,757, filed Jan. 11, 1982, now U.S. Pat. No. 4,481,635.

BACKGROUND OF THE INVENTION

This invention relates to gas discharge devices in general and more particularly to a novel apparatus for speeding up the process of starting the generation of gas discharge in a ring laser gyroscope which permits the generation of laser beams therein.

Ring laser gyroscopes are commonly used as angular rate sensors. An integral part of the ring laser gyro is the laser beam source of generator. One form of a laser beam generator comprises a gas discharge device in combination with a plurality of mirrors which define a closed path. The path is usually triangular or rectangular, but a pentagonal path etc. could also be used.

Present day ring laser gyros employ a gas discharge device using an He-Ne gas which is excited by an electric current passing therethrough ionizing the gas creating a plasma. As is well understood by those skilled in the art, the ionized gas produces a population inversion which results in the emission of photons, and in the case of He-Ne, a visible light is generated which is indicative of the plasma. If the gas discharge device is properly positioned with respect to the plurality of mirrors, the excited discharge tube will result in two counterpropagating laser beams to travel in opposite directions along an optical closed-loop path defined by the mirrors.

In some embodiments of ring laser gyros, a unitary body provides the gas discharge device including the optical closed-loop path. Such a system is shown in U.S. Pat. No. 3,390,606 by Podgorski, which is assigned to the same assignee as the present invention. There shown, a unitary block forms an optical cavity. A selected lasing gas is used to fill the optical cavity. Mirrors are positioned around the optical cavity at appropriate locations such that counterpropagating beams are reflected so as to travel in opposite directions along the optical cavity. A gas discharge is created in the gas filled optical cavity by means of an electrical current flowing in the gas between at least one anode and at least one cathode which are both in communication with the gas filled optical cavity.

It should be noted that prior art ring laser gyro systems are usually provided with a pair of electrical currents which flow in opposite directions. Each of the electrical currents create plasma in the gas. The current is established by an applied electrical potential, of sufficient magnitude, between one cathode and one anode. As a consequence of the electrical current through the gas, the current affects gas molecule flow. Since the electrical currents usually flow in at least a portion of the path traversed by the laser beams, the gas flow caused by the electrical current results in a bias or error term in the gyro output. Accordingly, in the practice of ring laser gyros, a pair of electrical currents are usually generated in order to balance the gas flow effects caused by the individual currents. In ring laser systems of the prior art, a pair of electrical currents can be provided by a single cathode and a pair of anodes symmetrically placed relative to the closed-loop path of the laser beams so that gas flow effects caused by one of the electrical currents is balanced by gas flow effects caused by the other one of the electrical currents.

Ring laser gyro systems similar to that just described have two inherent characteristics which hinder the ability to make the device lase. First, the unitary body forming the optical cavity is usually of a very high dielectric index resulting in the existence of stray capacitances between the electrodes and other parts of the structure. These stray capacitances result in electrical charge buildup on or in the cavity creating an electric potential which must be overcome by a start up potential applied between each cathode and anode pair of electrodes to initiate electrical current between the cathode and anode so as to ionize the gas and create the plasma. Further, in some systems, particularly triangular ring lasers, the electrodes are not in a straight line relationship with each other through the cavities, the current through the gas between the cathode and anode must follow at least a pair of connected cavity line segments forming the closed-loop path. As a result, the start up potential required to initiate the electrical currents between each cathode and anode pair is very large and much greater than that required to initiate a current through a straight tube laser. Thus, in the prior art, initiation of electrical currents between the cathode and anode to ionize the gas and subsequently cause the generation of laser beams is unreliable, usually slow to start, and requires a very large start up electrical potential between each cathode and anode pair.

SUMMARY OF THE INVENTION

The present invention describes an apparatus for increasing the reliability of producing a current through a gas discharge tube in a sufficiently small time and reduce the requirement of the value of the electric potential required to produce the current. The apparatus when employed in combination with ring laser gyroscopes increases reliability of initiating a discharge current through the gas, and reduces the start up time and reduces the electric potential required to initiate the discharge current through the gas for producing laser beam generation in both directions.

DETAILED DESCRIPTION OF THE INVENTION

Figure 1:
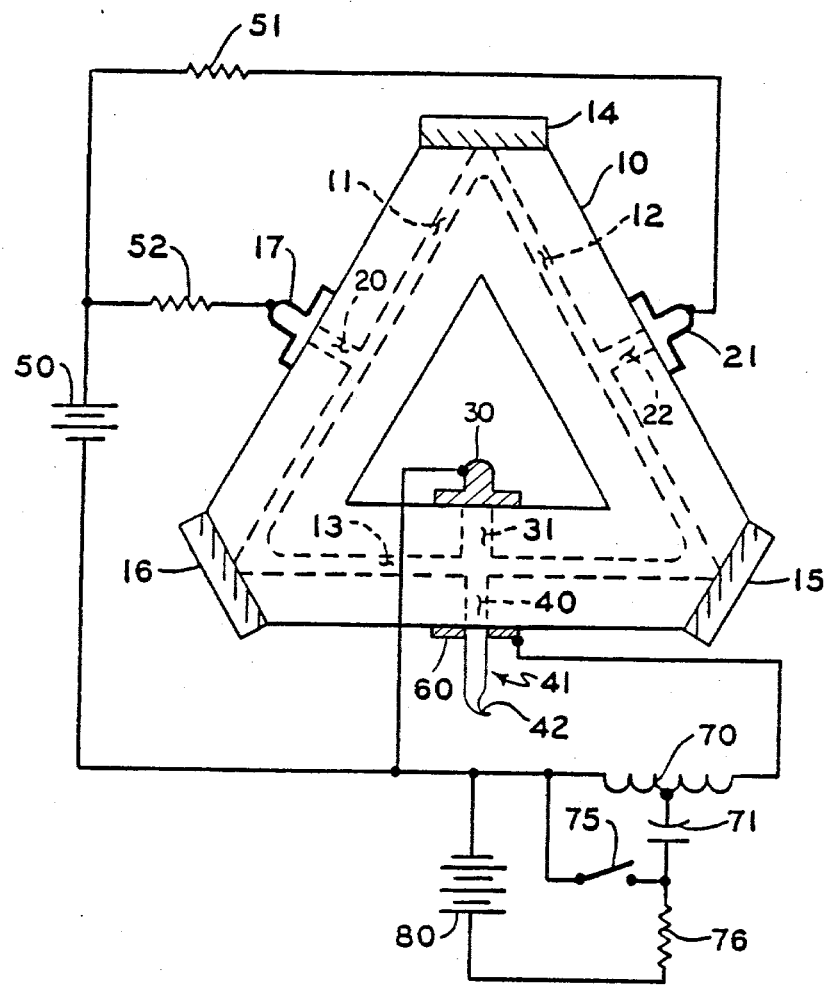
FIG. 1 is a diagrammatic representation of a ring laser gyro and a start up mechanism of the prior art.

Referring now to FIG. 1, there is disclosed a pictorial representation of a gas filled ring laser gyroscope incorporating a prior art start up mechanism. The gyroscope includes a body portion 10, defined by outer wall portions, typically made of ultra-low expansion material such as CerVit which is made by Owens, Illinois Corporation. Associated with the CerVit material is a very high dielectric index. Bored through the body are interconnected cavities 11, 12, 13, 20, 22, 31 and 40. Interconnected cavities 11, 12 and 13 are defined by outer wall and inner wall portions of body portion 10 and are arranged so as to form a triangular shape to provide an optical closed-loop path. Located at each apex of the triangular shaped interconnected cavities are mirrors 14, 15 and 16 which provide by reflection an optical path through the cavity, which cavity includes cavities 11, 12 and 13. Each mirror forms a common interface to a pair of interconnected cavities, and the mirrors serve as a leak proof interface relative to the interconnected cavities. The selected gas of the laser gyro is introduced into the plurality of cavities through glass tube 41 coupled to cavity 40. In the prior art, glass tube 41 was pinched off at 42 sealing the selected gas within the plurality of interconnected cavities. A first anode 17 communicates with gas in cavity 11 through cavity 20. A second anode 21 is in communication with gas in cavity 12 through cavity 22. A cathode 30 communicates with gas in cavity 13 through cavity 31, and also communicates with gas in tube 41 through cavity 31, a portion of cavity 13, and cavity 40.

As was indicated earlier, in order to commence lasing action, i.e. generate the laser beams, the cavity filled with gas must contain atoms having an elevated electron state. This is accomplished by establishing a discharge current through the gas creating a plasma somewhere along at least any one of the cavities 11, 12 or 13 forming the optical closed-loop path. In the system shown in FIG. 1, plasma can be established in the portion of cavity 11 and cavity 13 between anode 17 and cathode 30 by applying an electric potential source 50 of sufficient magnitude therebetween. A resistor 52 is connected between source 50 and anode 17 for current limiting purposes. The electric potential source 50 must be sufficiently large to generate and/or accelerate at least a first group of initiatory free charges between anode 17 and cathode 30 so as to ionize the gas and subsequently initiate an electric current between anode 17 and cathode 30. Because of the polygonal geometry of the triangular shaped gyro shown in FIG. 1, electric potential source 50 must be very large—in the order of 4,000 volts—in order to accelerate the initial free charges. Once the gas has been ionized and an electrical current flows between the anode 17 and cathode 30 through the gas, a rapid generation of free charges takes place such that the electric potential source 50 can be reduced in value—in the order of 1,000 volts—to maintain the current flow between anode 17 and cathode 30. However, depending on any residual charges on body 10 before each start up, even a greater electric potential may be required to start the initial current to flow in a very short response time.

As shown in the drawing of FIG. 1, a second anode 21 is symmetrically placed relative to the interconnected cavities 11, 12 and 13 and the cathode 30. Anode 21 and anode 17 are connected to the same polarity side of source 50 with anode 21 connected to source 50 through current limiting resistor 51, and thus anode 17 and anode 21 are substantially at the same electric potential. This will result in a plasma in portions of cavities 12 and 13 between anode 21 and cathode 30. As is well known, non-symmetrical flowing gain atoms in the laser angular rate sensor generates a bias (Langmuir flow effects). Thus, the plasma is split and balanced so that the effect of one leg is cancelled by the other. The balance placement of a single cathode and two anodes or a single anode and two cathodes satisfies the necessary balancing when they are symmetrically located. (It should be noted that the single anode or single cathode system represents a pair of electrodes in common.) Of course, these principles of balance are also necessary in rectangular shape ring laser gyros where four cavities are interconnected to form a rectangular optical closed-loop path. Balancing of plasma is also necessary in other types of closed-loop configurations.

A start up mechanism was provided in the prior art to start the laser by a method which produced high voltage high frequency transients to initiate the discharge current for permitting the generation of laser beams. Such a prior art system is shown in FIG. 1.

Referring again to FIG. 1, there is disclosed a pictorial representation of a start up mechanism for starting the lasing action. Free charges are generated and/or are accelerated in cavities 31, 40 and the small portion of cavity 13 which interconnects cavities 31 and 40. Eventually, after a delay time, some of these free charges make their way to initiate a current between cathode 30 and either anode 17 or 21, but not necessarily both. The free charges as aforesaid are provided by a start up mechanism in a manner as will now be described.

In FIG. 1, an electrically conductive material 60 is attached to body 10 and surrounds the interface of glass tube 41 and body 10. The electrically conductive material is electrically connected to one end of a high voltage transformer 70. The other end of transformer 70 is connected to cathode 30 and one end of a second electric potential source 80. Transformer 70 has a tap which is connected to one end of capacitor 71. The remaining end of capacitor 71 is connected to cathode 30 through switch means 75. The end of capacitor 71 not connected to the tap is connected to the other end of electric potential source 80 through current limiter resistor 76.

In FIG. 1 a first distributed electric field is established between cathode 30 and anode 17 and a second distributed electric field is established between cathode 30 and anode 21 by virtue of electric potential source 50 between cathode 30 and anodes 17 and 21. The electric potential source 50 is assumed in FIG. 1 to be insufficient in magnitude to initiate ionization of the gas and initiate the generation of free electric charges of its own accord, anywhere in the gas, but which is sufficient in magnitude to maintain established electrical currents between cathode 30 and anodes 17 and 21.

The combination of elements of transformer 70, capacitor 71, switch means 75, resistor 76, and electric potential source 80 provide a start up mechanism which supplies high voltage high frequency ringing transients between the ends of transformer 70 and accordingly between the electrically conductive material 60 and cathode 30. The start up mechanism of FIG. 1 establishes a third distributed electric field distributed between cathode 30 and the electrically conductive material 60. If the high voltage transients provided by transformer 70 are sufficiently large, the third distributed electric field will be capable of generating an initial group of free charges between the electrically conductive material 60 and cathode 30 for the establishment of an initial current between cathode 30 and either anode 17 or anode 21, but not necessarily both. This is possible by virtue of the electrically conductive material being in the proximity of the glass tube which is the thinnest dielectric material between the electrically conductive material and the gas. Once the initial current is established between either one of anode 17 or anode 21, an increased amount of free charges will be generated therefrom so as to result in a plasma between cathode 30 and one of or both anodes 17 and 21.

Although the prior art start up mechanism was effective to start the laser, it was unreliable in starting current in both plasma paths. Further, it was slow to initiate the discharge current and start the laser. Several operations, open and close, of switch means 75 usually were required to start the laser, further decreasing its overall effectiveness. Lastly, the start up mechanism was costly because of the number of added elements required for providing the high voltage high frequency transients.

Figure 2:
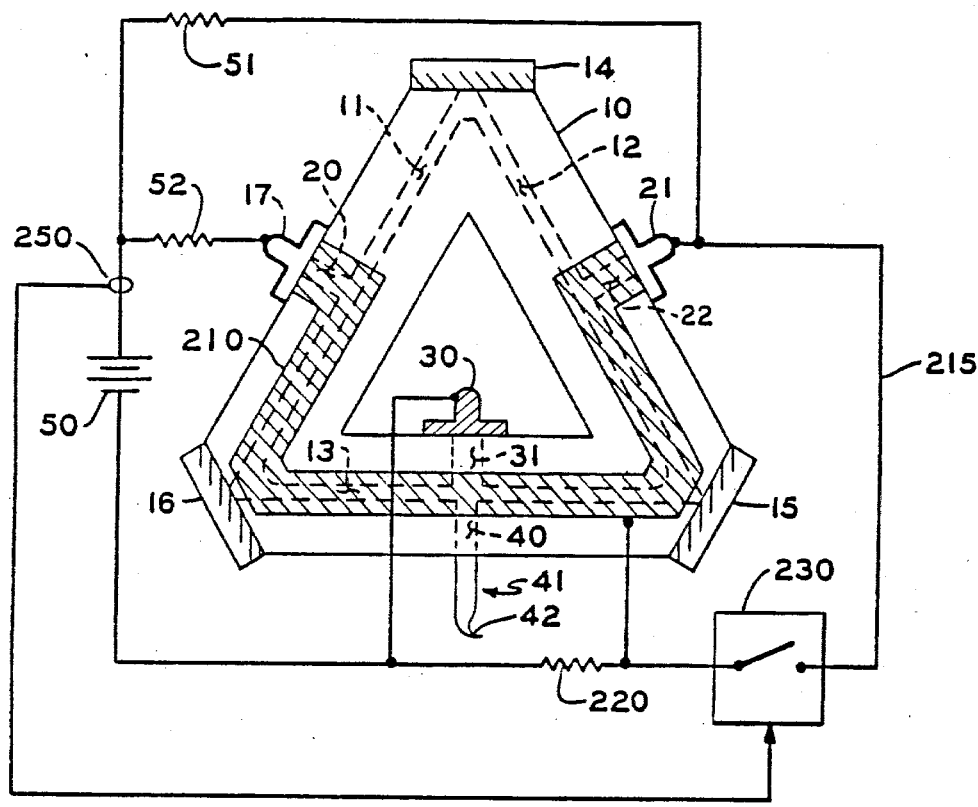
FIG. 2 is a diagrammatic representation of one embodiment of the present invention.

Referring now to FIG. 2, there is disclosed a similar laser gyro structure with a start up mechanism of the present invention. In FIG. 2, similar functioning elements as those in FIG. 1 have retained the same numeral designation. In FIG. 2, an electrically conductive material 210 adjoins the body 10 and extends along the outer walls following a path between anode 17 and anode 21 extending along cavity 20, a portion of cavity 11, cavity 13, a portion of cavity 12, and cavity 22. In essence, the electrically conductive material follows a path defined by those portions of the interconnected cavities which would normally exhibit the plasma (the visible discharge). Like FIG. 1, anode 17 and anode 21 are essentially at the same electric potential except for any voltage drops across the limiting resistors 52 and 51 respectively. Anode 21 is shown electrically connected to one end of switch means 230 through an electrical conductor 215. The other end of switch means 230 is electrically connected to the juncture of electrically conductive material 210 and one end of impedance means shown as a resistor 220. The other end of impedance means 220 is electrically connected to cathode 30. Switch means 230, when operative, electrically causes the anode 17 and anode 21 and the electrically conductive material 210 to be at substantially the same electric potential relative to cathode 30.

The operation of FIG. 2 will now be described. Electric potential source 50 should have a value to sustain an established current through the gas between cathode 30 and anodes 17 and 21. This would typically be in the order of 1000 volts. Electric potential source 50 of this value will be capable of maintaining an established current, but is usually insufficient to initiate the current in the absence of the start up apparatus of the present invention. Impedance means 220 is a high value resistor—in the order of 100 M—which provides the function of bleeding any residual electrostatic charges on body 10. The resultant electrostatic potential distribution on body 10 is thus made conducive to establishing the initial discharge current between cathode 30 and both anodes 17 and 21. Unwanted charges and resultant unwanted electric fields are diminished. In order to initiate the discharge current through the gas, switch means 230 electrically connects anode 17, anode 21 and the electrically conductive material 210 to one side of electric potential source 50, by virtue of conductor 215, until sufficient current is established between cathode 30 and anodes 17 and 21. This is indicated by a current sensing device 250 for operating on switch means 230. Once sufficient current is established, switch means 230 is operated to disconnect electrically conductive material 210 from anodes 17 and 21. Switch means 230 could also be a "timed" switch for momentarily making the aforesaid electrical connection a predetermined time. This scheme would obviate the need for current sensing device 250.

The electrically conductive material 210 serves several functions: (1) it serves as an equal-potential surface for establishing the electric potential distribution of the body 10 which thereby initializes a charge condition along the discharge path in the body, and specifically along the inner walls forming the gas-filled cavities so that they are conducive for start up; (2) it enhances the generation of free charges and enhances the acceleration of free charges along the normal operating discharge current path (plasma path); and (3) it creates a resultant displacement current discharge along the normal operating discharge current path. Note that the discharge current is that which occurs through the gas as the result of the potential applied between the cathode and anode by source 50. The displacement current is that which occurs along the discharge path as a result of the rapid electric potential distribution change of body 10 from a first to a second electric potential distribution due to the change caused by switch means 230. The difference in electric potential distribution change required for start up must be at least sufficient in magnitude to establish the displacement current and ultimately the discharge current for producing the laser beams.

Although not shown in FIG. 2, an alternative arrangement is possible for start up. Switch means 230 may be used to connect electrically conductive material 210 directly to the cathode 30 instead of to anodes 17 and 21, and impedance means 220 may be connected between electrically conductive material 210 and one of anodes 17 and 21. This alternative provides essentially the same field generation as FIG. 2, but in a reverse sense as that already described.

As indicated earlier, impedance means 220 allows continuous bleeding of residual electric charges from body 10 except when electrically conductive material 210 is electrically connected to anodes 17 and 21 through conductor 215 and switch means 230. Accordingly, before start up, body 10 was maintained at a first electric potential distribution condition through the equal potential surface provided by electrically conductive material 210. Subsequently, the electric potential distribution is changed to a second electric potential distribution condition through switch means 230 and in turn started the discharge current for producing the laser beams.

Figure 4:
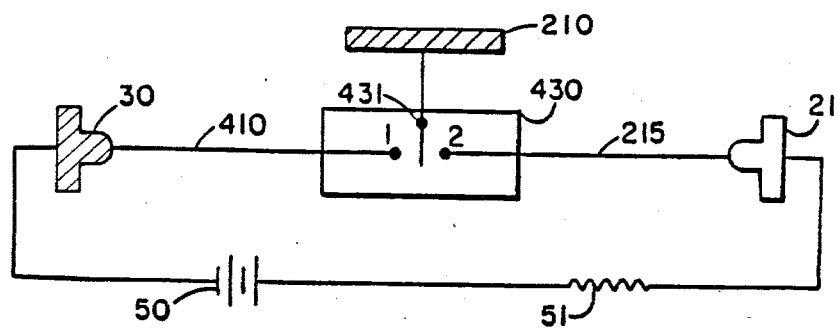
FIG. 4 is an alternate arrangement of FIG. 2.

Another alternate arrangement of FIG. 2 is shown in FIG. 4. Switch means 230 is replaced by single pole double pole switch 430. The center pole 431 is electrically connected to electrically conductive material 210 adjoined to body 10 in a manner similar to FIG. 2. When switch 430 is in position-1, the center pole 431 is electrically connected to cathode 30 through conductor 410. When switch means 430 is in position-2, center pole 431 is electrically connected to anodes 17 and 21 through conductor 215.

The behavior of the arrangement shown in FIG. 4 with the discharge device shown in FIG. 2 is similar to that already described with respect to FIG. 2. Again, the electrically conductive material 210 serves as an equal potential surface for establishing the electric potential distribution of body 10. To start the discharge currents, switch 430 is first placed in either position-1 or position-2 so as to initialize the electric potential distribution condition (electric charge condition) of body 10, particularly along the discharge path through the gas-filled cavities 11, 12 and 13. This is so since the electrically conductive material 210 will be connected to either anode or cathode. Consequently, the electric potential distribution of body 10 will be polarized accordingly since the equal potential surface provided by electrically conductive material 210 will be at the potential of either the cathode or anode respectively. After the electric potential distribution condition of body 10 has been initialized, switch 430 is immediately placed in an alternate position, 2 or 1 respectively. Doing so, the electrically conductive material is connected to the opposite electrode resulting in the initial electric potential distribution of body 10 dramatically changing causing the discharge current to be initiated for starting the laser. This assumes, as before, that the potential between the cathode and anodes is sufficient in magnitude to maintain a discharge current through the gas once it is established. In the particular embodiment of FIG. 4, discharge current is initiated by reversing the polarization of the electric potential distribution on body 10, and the magnitude of the change in the potential distribution is dependent on the value of source 50. The speed of changing positions of switch means 230 or 430 is not extremely critical since a manual change of a manual switch is satisfactory for starting the discharge current for laser beam generation.

The electrically conductive material 210 may be, by way of example, a metallic strip such as a thin copper foil with an adhesive backing. The strip may then be adjoined to body 10, by the adhesive, so as to extend along a path as aforesaid. It should be noted that electrically conductive material 210 need not extend along the entire path normally exhibited by the plasma as that indicated in the configuration shown in FIG. 2. That is, the electrically conductive material need only be present along some portions of a path between cathode 30 and anodes 17 and 21. This is so, since the electrically conductive material placed along any portion of the path normally containing the plasma will enhance generation and acceleration of free charges for start up. Note that it is advantageous to provide an electrically conductive material to at least include a portion of both cavities 11 and 13 about the common interface therebetween and at least a portion of both cavities 13 and 12 about the common interface therebetween. The presence of the conductive material being appropriately located as aforesaid, will enhance the generation of free charges at the common interfaces. This will serve to lessen resistance to the establishment of the initial electrical currents between cathode 30 and anodes 17 and 21 because it forces the electrical currents therebetween to follow a prescribed path around the common interfaces (corners). Further, the presence of the conductive material being appropriately located as aforesaid will enhance the acceleration of free charges between the cathode and the corner, and between the corner and the anode. This is so since a linear acceleration path is established between the corner and the electrodes due the electric field established therebetween at start up. The resulting enhancement of the generation of free charges and the acceleration increases the reliability of initiation of the discharge current.

Figure 3:
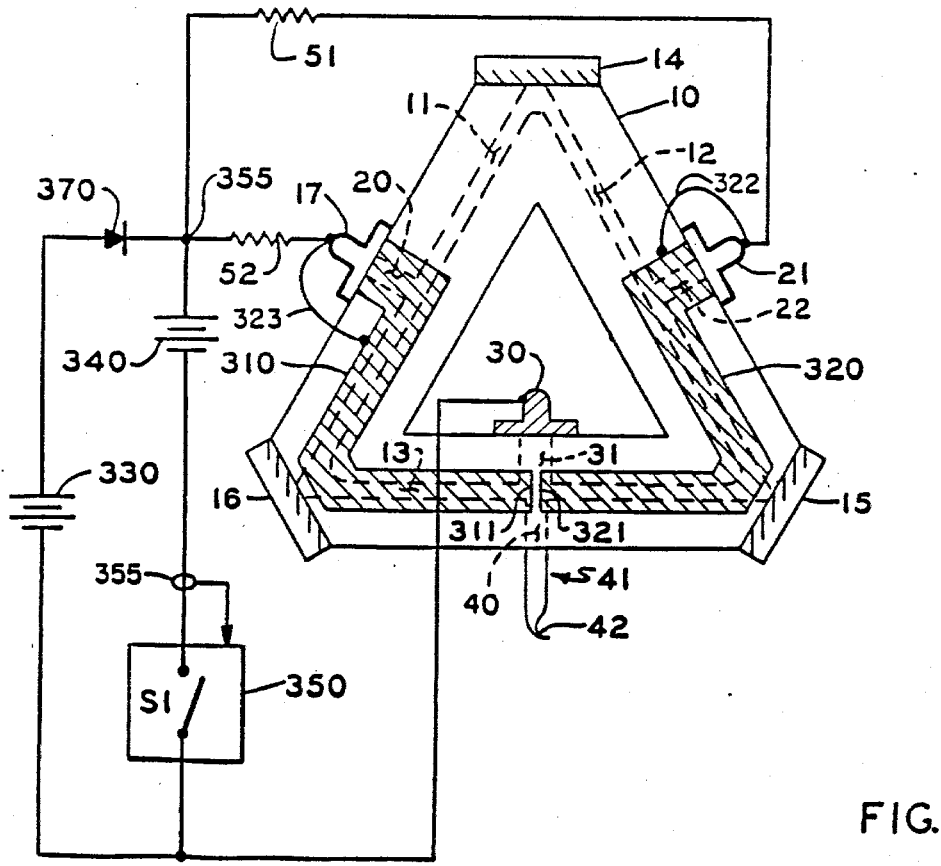
FIG. 3 is a diagrammatic representation of another embodiment of the present invention.

Shown in FIG. 3 is another embodiment of the invention wherein an electrically conductive material is adjoined to body 10 of the laser gyro and extending along the outer walls thereof following a path substantially defined by the normal plasma path. In FIG. 3, similar functioning components as those in FIG. 1 have retained the same numeral designation. There shown, a first electrically conductive material 310 is shown adjoined to body 10 following a path substantially defined by cavity 20, a portion of cavity 11, and a portion of cavity 13. Electrically conductive material 310 terminates at or about the vicinity of cathode 30 and is indicated by numeral 311. A second electrically conductive material 320 is shown adjoined to the body 10, following a path substantially defined by cavity 22, a portion of cavity 12, and a portion of cavity 13. Electrically conductive material 320 is terminated at or about the vicinity of cathode 30 and is indicated by numeral 321. Electrically conductive material 310 is electrically connected to anode 17 through an electrical conductor 323; and electrically conductive material 320 is electrically connected to anode 21 through an electrical conductor 322. An electric potential source 340 is electrically connected to the juncture of resistors 51 and 52, the other end of resistors 51 and 52 being connected to anodes 21 and 17, respectively, as already indicated in FIG. 1. The other end of electric potential source 340 is connected to cathode 30 through a switch means 350. Another electric potential source 330 is connected between cathode 30 and the anode of a diode 370. The cathode of diode 370 is electrically connected to the juncture of resistors 51, 52 and electric potential source 340. Note that in some situations plasma oscillations can occur because of parasitic capacitances between the anodes and the case (not shown) which acts as a ground plane. To circumvent this problem, it may be desirable to replace electrical conductors 322 and 323 with high value resistors (Mohm). Nevertheless, anode 17, anode 21, and electrically conductive materials 310 and 320 will all be at substantially the same potential relative to the cathode 30.

The start up means in FIG. 3 comprises electrically conductive materials 310 and 320, the electric potential source 340, and switch means 350. Electrically conductive materials 310 and 320 serve substantially the same function as electrically conductive material 210 in FIG. 2 and FIG. 4. In the following discussion, it is assumed that electric potential source 340 has a magnitude known as the start voltage, and electric potential source 330 has a magnitude known as the run voltage which is less than the magnitude of the electric potential source 340. To start the lasing action in the gyro, switch means 350 is operative to close the switch S1 connecting the electric potential source 340 between cathode 30 and both anodes 17 and 21. Concurrently, closure of switch means 350 also electrically connects electrically conductive materials 310 and 320 to the electric potential source 340 by virtue of connection thereof to their respective anodes 17 and 21. Doing so, establishes concentrated third and fourth distributed electric fields along the normal plasma path between cathode 30 and anode 17, and cathode 30 and anode 21. (The first and second distributed electric fields being established by the potential difference between cathode 30 and anode 17, and cathode 30 and anode 21, respectively.) The third and fourth distributed electric fields enhance the generation and acceleration of free electric charges along the normal plasma path. The concentrated third and fourth fields force the free charges to follow a prescribed path, defined by the electrically conductive materials 310 and 320, resulting in faster turn on and a lower requirement for the value of the electric potential source 340 to establish the current through the gas between cathode 30 and anode 17 and between cathode 30 and anode 21.

In the above situation, since electric potential source 330 is less than electric potential source 340, diode 370 is reversed bias and electric potential source 330 is substantially out of the circuit. However, when sufficient current is flowing through the gas, current sense means 355 directs switch means 350 to open switch S1 and disconnect electric potential source 340 from the circuit resulting in electric potential source 330 being operative in the circuit. Source 330 must be of sufficient magnitude so as to maintain the currents to flow through the gas as already established by start up means. As in FIG. 2, current sense means can be eliminated by the use of a timed switch.

The embodiment shown in FIG. 3 for starting the lasing action in the gyro results in a faster start up and a lower requirement for the start up magnitude of electric potential source 340.

Although shown in FIG. 3 are two separate electric conductive materials 310 and 320, they may be combined into one electrically conductive material. That is, one continuous electrically conductive material may be provided between anode 17 and anode 21. However, it is possible in some circumstances to only generate a current between cathode 30 and only one of the anodes 17 or 21. This can be circumvented by elimination of conductors 323 and 322, and directly connecting the continuous electrically conductive material to electric potential source 340 at the juncture of resistors 51 and 52. This alternate version works equally well as that shown in FIG. 3, but would require, in the practical implementation of such a system, an additional wire outside the basic gyro block containing the cathode and anodes.

Although not shown, it is commonly known to balance the electrical currents, after start up, between cathode 30 and anode 17, and cathode 30 and anode 21 for a properly operating ring laser gyro. The control of such currents is well known in the art and is beyond the scope of the present application since it only applies to the state of the run condition after the start up has taken place The novel start up means shown in FIGS. 2, 3 and 4 utilizing the electrically conductive material as an equal electric potential surface extending along the normal current path between the cathode and the anodes provides an added distributed electric field which enhances the generation and acceleration of free electric charges along the path thereof and makes an easier starting laser gyro. The principles of electrically conductive material are equally applicable for linear lasers as well as any type of gas discharge device in which a current is intended to pass through a gas. The electrically conductive materials then allow an increased reliability of start up, lower electric potential requirements for start up, and a decrease in time for start up.

The start up apparatus for initiating electrical current through the gas in discharge devices, and specifically the ring laser gyro have been presented. The electrically conductive material like that shown in FIGS. 2, 3 and 4 enhance generation and acceleration of free charges along a prescribed path defined by the location of the electrically conductive materials adjoined to the body of the discharge device. Doing so reduces the start up time as well as the requirement for the start up voltage for discharge devices in general and specifically a ring laser gyro. Although the ring laser gyros shown in FIGS. 2 and 3 utilize a single cathode and one or two anodes, the principles of the invention are equally applicable to ring laser gyros having a single anode and two cathodes. Further arrangements of the application of electrically conductive materials and associated circuits can no doubt be devised without departing from the scope of the present invention and are applicable to a variety of discharge devices and configurations of ring laser gyros.

The embodiments of the invention in which an exclusive property or right is claimed are defined as follows:

1. A gas discharge device comprising:
    a body having outer wall portions and inner wall portions, said inner wall portions enveloping a cavity containing a gas;
    first and second electrodes in communication with said gas, said first and second electrodes being electrically connected to at least a first electric potential source of sufficient magnitude to establish a first distributed electric field therebetween to at least maintain an electrical current, once established by ionization of said gas, between said first and second electrodes;
    an electrical conductor adjacent to and extending along said body outer wall portions and following at least a portion of a discharge current path through said gas between said first and second electrodes, said electrical conductor being electrically connected to said first electrode through an impedance means; and
    switch means for electrically connecting said electrical conductor, upon command, to said second electrode to cause the potential of said electrical conductor and said outer wall body portions adjacent thereto, to be at substantially the same potential as said second electrode and thereby initialize an electrical current between said first and second electrodes through said gas.

2. The apparatus of claim 1 wherein said gas discharge device is a laser beam generator.

3. The apparatus of claim 1 wherein said electrical conductor is rigidly fixed to said body.

4. The gas discharge device of 1 where said electrical conductor comprises a metallic foil affixed to said body portion.

5. The gas discharge device comprising:
    a body having outer wall portions and inner wall portions, said inner wall portions enveloping a cavity containing a gas;
    first and second electrodes in communication with said gas, said first and second electrodes being electrically connected to at least a first electric potential source of sufficient magnitude to establish a first distributed electric field therebetween to at least maintain an electrical current, once established by ionization of said gas, between said first and second electrodes;
    means for establishing the electric potential distribution of said body substantially equal to the electric potential of said first electrode; and
    means for changing said electric potential of said body portion from the electric potential equal to said first electrode to an electric potential substantially equal to the potential of said second electrode sufficiently fast to establish an electrical current between said first and second electrode through said gas.

6. The apparatus of claim 3 further including:
    an electrical conductor adjacent to and extending along said selected ones of said body outer wall portions and following at least a portion of a discharge current path through said gas between said first and second electrodes.

7. The apparatus of claim 4 wherein said gas discharge device is a laser beam generator.

8. The gas discharge device of 5 where said electrical conductor comprises a metallic foil affixed to said body portion.

* * * * *